May 18, 1937.   G. C. MILLER   2,081,092
APPARATUS FOR PACKAGING ASSORTED CONFECTIONS
Filed April 26, 1933   2 Sheets-Sheet 1
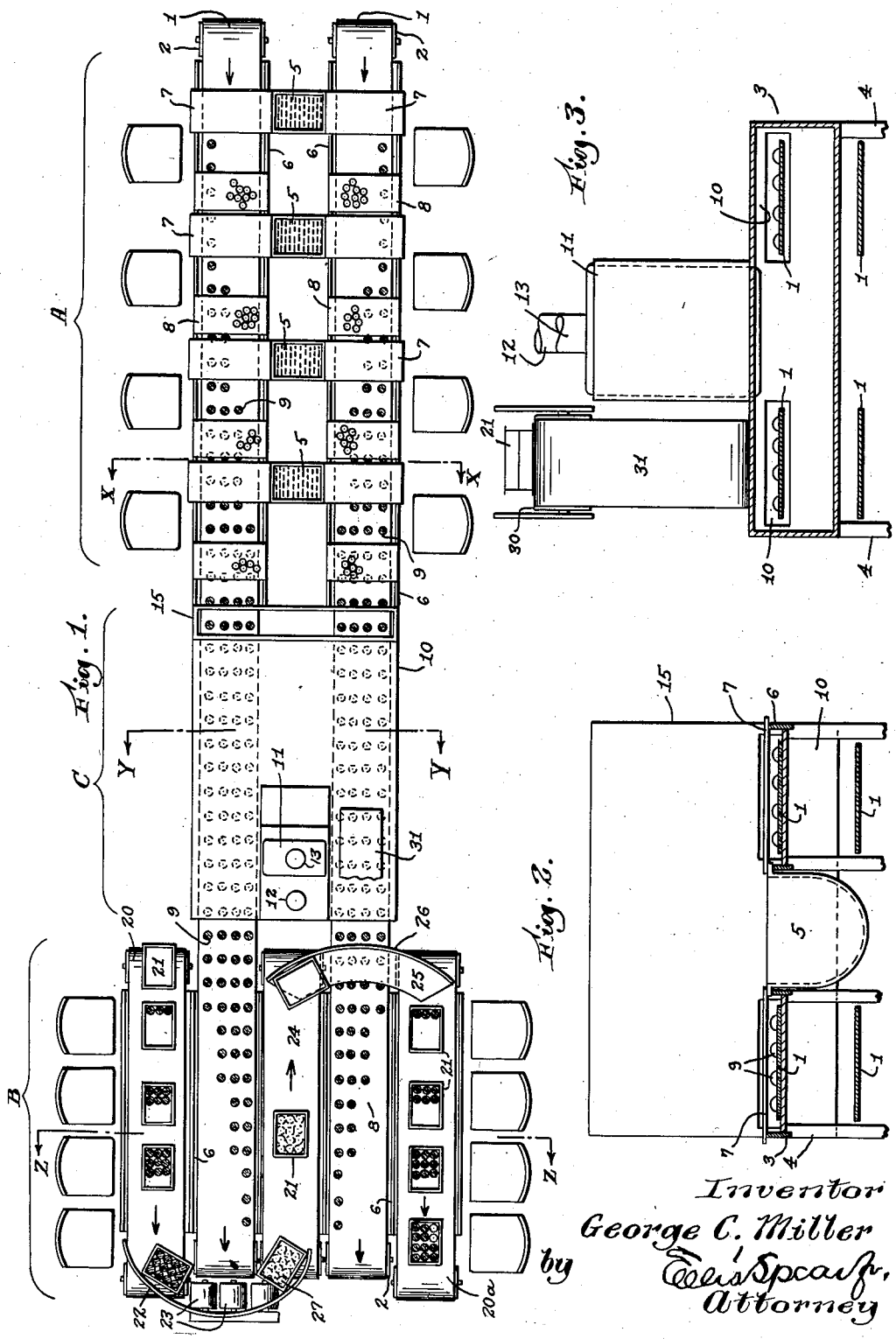
Inventor
George C. Miller
by Ellis Spear Jr.
Attorney

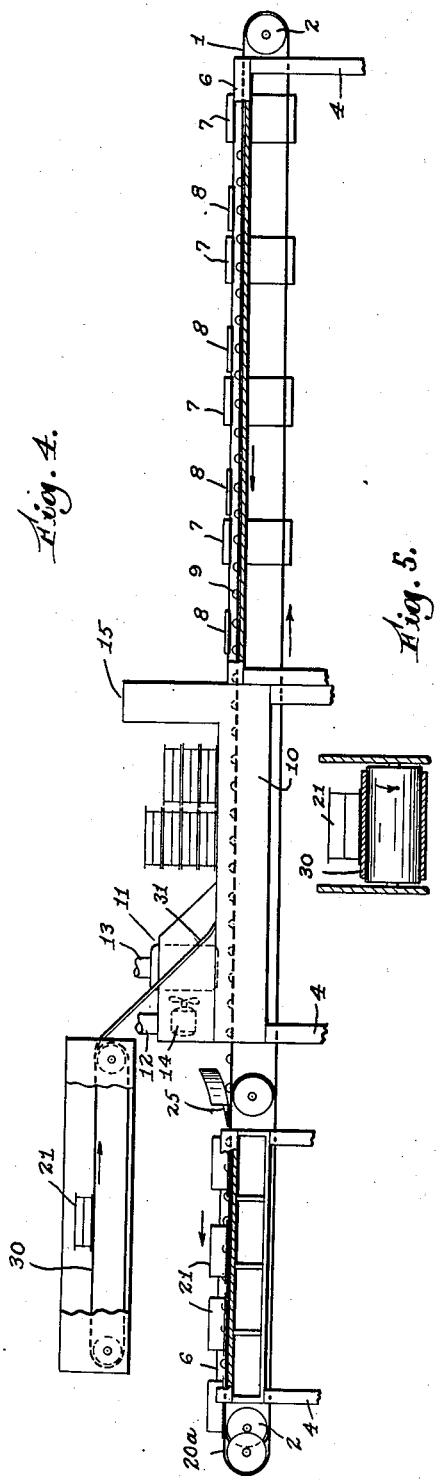

Patented May 18, 1937

2,081,092

UNITED STATES PATENT OFFICE 2,081,092

APPARATUS FOR PACKAGING ASSORTED CONFECTIONS

George C. Miller, Brighton, Mass., assignor to Excelsior Machine Corporation, a corporation of Massachusetts Application April 26, 1933, Serial No. 668,085

8 Claims. (Cl. 226—129)

In the production of packaged assortments of chocolate or like dipped centers or other predetermined mixtures of candy or the like, it is of great importance to maintain the standard assortment in kind and number.

This is particularly true of packs of such mixtures, as for example, boxed chocolate mixtures, bonbons, fruit or nut specialties.

In such mixtures, which are usually piece named or trade-marked, the particular pack is bought sealed, usually in reliance upon the presence, or absence of certain items in the discrimination of the purchaser.

"Quick sales", "week end" or "holiday" packages, particularly afford a problem because they usually have to be produced at a low price. The expense of the assured or guaranteed assorted mixture package involves considerable factors of counting, sorting, handling and with all the necessity of assured result.

From the urgent need of making possible to manufacturer and to consuming public such pack mixtures with a maximum of certainty of standard and a minimum of cost, the present concept sprang.

Essentially, this concept is one of method, although in its development there are important though fortunately simple mechanical combinations involved. While these may be and in most cases must be varied to suit the resources and facilities of the individual manufacturer, the accompanying drawings illustrate a characteristic device for the production of such unit packs in accordance with this invention.

These are to be taken as illustrative, although representing practical machines effectively operative under practical conditions to produce commercial packs in quantity and at low cost. As a basis of simplicity and as illustrating the possibility of utilizing hand labor, I have shown my machine as being operated with hand dipping work.

Obviously, the machine might be wholly or more largely mechanical or automatic in operation. The employment of hand labor being at the present time important, the mechanical illustration is reduced to a minimum to point to the possibilities of the hand labor basis. To those skilled in the art and practice, such illustration will afford full suggestion for other and more complicated equipment. Such may speed production or lower cost, but the method concept assures the result.

Throughout the specification and drawings, like reference characters indicate corresponding parts, and in the drawings:

Fig. 1 is a diagrammatic plan view of a machine presenting the essentials of the concept involved herein.

Fig. 2 is a view partly in cross section on the line x—x in Fig. 1.

Fig. 3 is a view partly in cross section on the line Y—Y in Fig. 1.

Fig. 4 is a side elevation of my machine presenting the essentials of the concept involved herein, and Fig. 5 is a view partly in cross section on the line z—z, Fig. 1.

In the drawings I have attempted to indicate with a minimum of detail a machine adapted for use where the available floor space is limited, but the machine is adaptable to floor space requirement to solve factory problems successfully.

My machine consists of a conveyor system including belts 1 running on rollers 2 journalled in any suitable frame 3 supported on legs 4 at convenient height for the operators who are usually seated at stations along the way.

The machine comprises three sections or zones, as indicated by the brackets in Fig. 1. The zone A is primarily the dipping and collecting zone. The cooling zone C is provided for the hardening of the coatings, and the delivery is made at the zone B.

Detachably mounted within the frame 3 are the coating pots 5. The frame includes dividing walls 6 for each belt upon which the dipping plates or palettes 7 are placed. The dividing walls 6 also support the trays 8 for the centers.

Each operator in the zone A has a different type of a center. Each center is dipped and then placed on the belt 1. As the belt moves by each station, the operator adds the type of candy which she is dipping. The candy placed on the belt 1 is shown by the shaded circles 9. Thus each longitudinal row or column of chocolates will be uniform.

The belts 1 carry the dipped centers through the cooling tunnel 10, as is shown in Fig. 3. The cooling unit 11 is standard and includes an air intake 12, a refrigerant inlet 13, an electric blower 14, and an air exhaust 15 upturned to avoid the direct contact of the cooled air on the operators. After the dipped centers have passed through the zone C, they are sufficiently hardened to permit packing.

The packing or boxing is done in the zone B. In this zone my machine is provided with a pair of conveyor belts 20 and 20a (see Figs. 1 and 5)

for the boxes 21 adjacent and parallel to the belts 1. A guide rail 22 and rollers 23 are provided so that the boxes 21 will be moved across the belt 1 to the box conveying belt 24 which moves in the opposite direction. A bridge 25 with a guide rail 26 is provided to carry the boxes 21 across the other belt 1 to the belt 20a. The movement of the boxes 21 across the rollers 23 and the bridge 25 is caused by pressure from succeeding boxes on the moving belts.

As the boxes 21 are placed on the belt 20 the operators in the zone B each pick up a predetermined number of a certain type of dipped centers 9. As most boxes have two layers of candy, a convenient and practical method is to have a complete layer packed in during this stage and a suitable covering such as is shown at 27 placed thereon so that when the boxes 21 reach the belt 20a, they will be ready for a repetition of the process just described whereby the box is filled. An operator stands at the end of the belt 20a and places covers on the boxes 21.

The boxes 21 are then placed on the conveyors 30 which may be mounted and driven to suit factory requirements and conditions. The conveyor 30 carries the boxes 21 back towards the zone C and deposits the boxes 21 on a slide 31. The boxes 21 are then picked up by operators in the zone C where they may be wrapped and handled in any way desired to facilitate economical production.

As before explained, the apparatus shown may be variously modified to practice my method of packing as herein indicated. The double form of the device in which there are parallel stations and conveyors is of great practical advantage in making possible a wide range of variety in the type of centers used without undue length to the apparatus. Where desired the apparatus might be made single with the number of stations in acordance with the requirements of the pack. Under other conditions the number of stations and conveyors combining to feed a common packaging station may be readily effected along the lines indicated.

It will be seen from the foregoing that I have provided by my method a novel basis for producing packs of assorted units with a maximum of assurance of the mixture desired for the pack. The direct packing of the fresh dipped centers coming from the cooler is also of very great advantage inasmuch as they are immediately placed in their ultimate container usually in a paper cup or holder, and are thus protected from damage such as might and usually would result from extended handling and re-handling of the units in trays before packaging.

All such variants and modifications as are above indicated are to be understood as in the concept of my invention both as to method and apparatus, the same being readily understood and capable of practice by those skilled in this art.

What I therefore claim and desire to secure by Letters Patent is:—

1. In an apparatus for packaging mixtures of candies of different kinds, a series of loading stations and a series of packing stations, an endless candy conveyor adapted to receive the candies in predetermined order at said loading stations and convey the assembly to said packing stations, at which one kind of a candy at each station may be successively removed from said conveyor and placed in a box, an endless box conveyor for supporting and continuously moving the boxes at the same speed as the candy to each successive packing station for the successive placing of the candy in a box until the predetermined mixture content of the box is completed.

2. In an apparatus for packaging mixtures of candies of different kinds, a series of loading stations and a series of packing stations, a pair of parallel endless candy conveyors adapted to receive the candies in predetermined order and convey the assembly to said packing stations, at which one kind of a candy at each station may be successively removed from one of said conveyors and placed in a box, a pair of parallel endless box conveyors for supporting and continuously moving the boxes at the same speed as the candy to each successive station, including means for transferring the boxes in succession for the successive placing of the candy in a box from one box conveyor to the other until the predetermined mixture content of the box is completed.

3. In an apparatus for packaging mixtures of candies of different sorts, a frame constituting an elongated conveyor way, a series of loading stations along one end of said way and adapted to be attended by a series of operatives, an endless conveyor belt running on said frame and having one surface moving continuously along from station to station to receive from each operative at each station in succession one kind of the candy in predetermined order, a series of removing stations at the other end of the frame and disposed adjacent said conveyor belt and adapted to be attended by a series of operatives each of whom successively removes one kind of candy from the succession of one kind of candy, and a box conveyor on the frame and parallel to the candy conveyor, and movable at the same speed as the candy conveyor and with one surface adjacent to the candy conveyor path past the said removing stations whereby the boxes may receive in succession the different kinds of candy until the mixture is complete.

4. An apparatus for use in packing coated articles of confection comprising, in combination, a pair of endless conveyors arranged side by side and travelling at substantially the same speed, a cooling chamber through which the conveyors travel, packing conveyors extending along the delivery end of each of the first named conveyors and arranged outwardly thereof but in close proximity thereto, said second conveyors travelling at substantially the same speed as the first conveyors, and a return conveyor positioned between and common to both of the first named conveyors and also travelling at substantially the same rate of speed as the other conveyors, each of said packing conveyors and the return conveyor terminating at a point closely adjacent to the cooling chamber, portions of the first named conveyors being disposed a material distance beyond the end of the cooling chamber remote from the packing and return conveyors and upon which the coated confection is initially deposited.

5. An apparatus for use in packing freshly coated candy in packs of predetermined assortment, comprising, in combination, an endless article conveyor, a cooling station through which the conveyor travels, a packing conveyor extending along said conveyor at the other side of said cooling chamber and arranged outwardly thereof but in close proximity thereto, said packing conveyor travelling at substantially the same speed as said article conveyor.

6. An apparatus for use in packing freshly coated candy in packs of predetermined assortment, comprising, in combination, a pair of endless article conveyors arranged side by side and traveling at substantially the same speed, a cooling chamber through which the conveyors travel, a packing conveyor extending along each of said article conveyors on the other side of said cooling chamber and arranged outwardly of said article conveyors but in close proximity thereto, and a return conveyor positioned between and common to both of the packing conveyors and adapted to convey said packs from the outer end of one packing conveyor to the inner end of the other packing conveyor.

7. An apparatus for use in packing freshly coated candy in packs of predetermined assortment, comprising, in combination, a pair of endless article conveyors arranged side by side and traveling at substantially the same speed, a cooling chamber through which said conveyors travel, a pair of packing conveyors extending along said article conveyors on the other side of said cooling chamber and arranged outwardly thereof, but in close proximity thereto and traveling in the same direction and at substantially the same speed as the article conveyors, a return conveyor positioned between and common to both of the packing conveyors, and package transfer means from the outer end of one packing conveyor to the outer end of said return conveyor, and a second package transfer means from the opposite end of said return to said other packing conveyor.

8. An apparatus for use in packing freshly coated candy in packs of predetermined assortment, comprising, in combination, a pair of endless article conveyors arranged side by side and traveling at substantially the same speed, a cooling chamber through which said conveyors travel, a pair of packing conveyors extending along said article conveyors on the other side of said cooling chamber and arranged outwardly thereof, but in close proximity thereto and traveling in the same direction and at substantially the same speed as the article conveyors, a return conveyor positioned between and common to both of the packing conveyors, and package transfer means from the outer end of one packing conveyor to the outer end of said return conveyor, and a second package transfer means from the opposite end of said return to said other packing conveyor, said transfer means extending transversely of the article conveyor ends.

GEORGE C. MILLER.